W. A. WALES.
Split-Second Time-Register.

No. 220,195. Patented Sept. 30, 1879.

Witnesses.
H. E. Lodge.
Edward H. Moulston

Inventor.
Wm. A. Wales.
F. Curtis, Atty.

UNITED STATES PATENT OFFICE.

WILLIAM A. WALES, OF NEWTON, MASSACHUSETTS, ASSIGNOR TO WILLIAM B. FOWLE, OF SAME PLACE.

IMPROVEMENT IN SPLIT-SECOND TIME-REGISTERS.

Specification forming part of Letters Patent No. 220,195, dated September 30, 1879; application filed May 22, 1879.

*To all whom it may concern:*

Be it known that I, WILLIAM A. WALES, of Newton, county of Middlesex, and State of Massachusetts, have invented certain Improvements in Split-Second Time-Registers, of which the following is a specification.

My present improvements relate to instruments for measuring, to the nearest tenth of a second, for instance, short intervals of time for scientific or sporting purposes, the class of instruments to which my invention relates being those in which "split second-hands," so called, are employed to note the extent of the interval of time sought.

My improvements relate to certain mechanism by which the two portions of the split second-hand are operated.

The drawings accompanying this specification represent, in—

Figure 2:
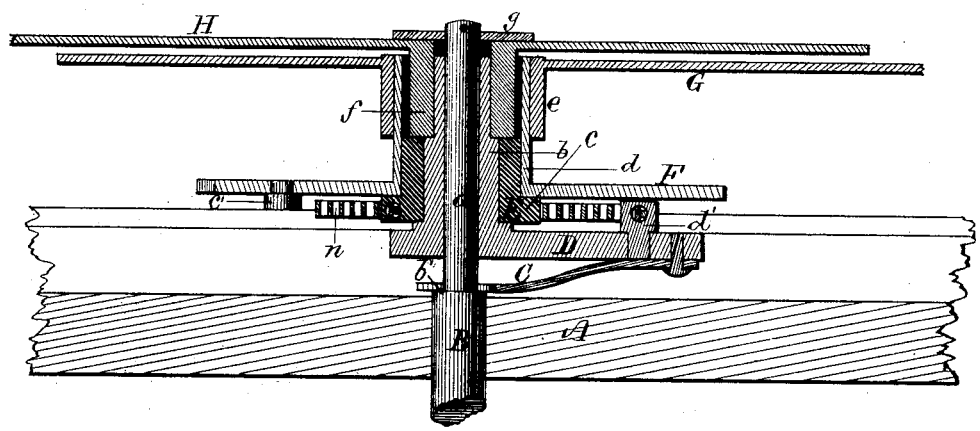
Figure 1:
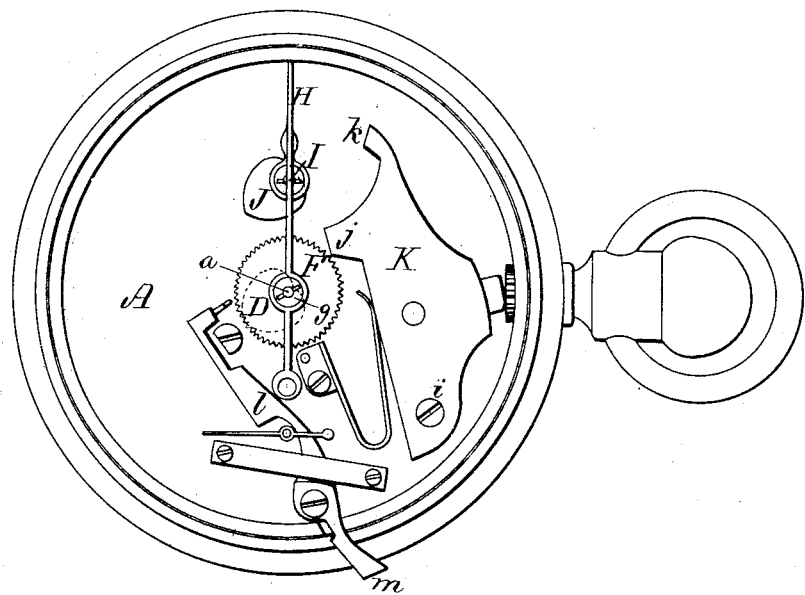

Figure 1, a face view or plan of the mechanism embracing my improvements. Fig. 2 is a vertical cross-section through the watch, and second-hands.

A represents the pillar-plate of the movement, and B the arbor of the third pinion of the movement, the pivot of such arbor, which extends through the plate and which carries the principal feature of my improvement, being shown at a.

D in the drawings represents a heart-cam, as formed with a tubular hub, b, which loosely encompasses the pivot a, such cam being prevented under ordinary circumstances from rotating upon the pivot a by a spring, C, interposed between the hub and a shoulder, b', formed upon the arbor B, the stress of this spring being sufficient to overpower the stress of a light hair-spring, which, in turn, exerts its stress between the cam and a toothed plate or disk carried by a friction-collet, E, encompassing the hub of the cam, as hereinafter explained, and yet being sufficiently loose to permit of the heart being returned to its zero, or normal, position by the action of the push-plate, also to be described.

E represents the friction-collet above alluded to, such collet loosely encompassing the lower part of the hub b of the heart D, and being formed upon its lower end with a collar or flange, c, which serves as a base to a circular disk or plate, F, the tubular hub d of which disk adheres with light friction to the collet E, and at its upper end, which extends considerably above the top or outer end of such collet, carries the lowermost or innermost of the two split second-hands, which is shown at G, the hub e of such hand G encompassing tightly the hub d of the disk, in order that the said hand G shall cling to the disk F, as the collet E rotates within the hub of such disk, when the latter is locked rigidly in position by a latch-bar, to be hereinafter explained.

The upper or outer one of the two split second-hands is shown at H as having a tubular hub, f, which tightly encompasses the upper end of the hub b of the heart D, and so as to rotate with such heart, while the said hub f extends loosely within the upper end of the hub of the disk F, to avoid contact with the latter.

A washer, g, is placed over the outer hand, H, upon the pivot a, and a pin passed through the latter, so as to compress the spring C upon the shoulder b' of the arbor B.

The minute-hand pivot is shown at I, and its heart-cam at J, while alongside of the two is arranged upon the plate A a thin plate, K, pivoted at one end to said plate A, as shown at i, in order to adapt it to approach or recede from the two hearts, the office of such plate K, which I term a "push-plate," being to restore the hearts, and, consequently, the minute and double or split second-hand to their normal or zero points.

To effect this the plate K has two spurs, j k, so disposed with respect to the hearts that, when pushed in toward such hearts, they shall wipe against their peripheries and restore them to their zero-points.

The periphery of the disk F is indented or toothed, as shown in the drawings, and I pivot to the plate A and alongside of such disk a latch-bar, l, provided with a spur, m, which extends through the bezel of the case, and so adjusted with respect to the disk that, when pushed inward, it shall engage and arrest the rotation of the disk if the train is in motion, and, when withdrawn, permit the disk to rotate.

Between the heart D and disk F, and encircling the pivot a, I arrange a coiled hair-spring, $n$, one end of such spring being secured to the heart, and the other to the disk.

When the train is in motion and the disk F is free from control of the latch, the two hands travel together (provided the balance is free) by and with the pivot $a$, as the heart D, which carries the hand H, clings to such pivot with sufficient friction to overcome the stress of the spring C upon the arbor B, while the collet E, which carries the disk F and hand G, cling to the hub of the heart with sufficient friction to travel with such heart.

To prevent injury to the hair-spring $n$ by a too long continued rotation of one hand away from the other, I affix to the under side of the disk F a stop-pin, $c'$, arranged in a concentric path with a second stop-pin or post, $d'$, erected upon the top of the heart D. If the revolution of the hand H is continued throughout an entire circle, the two pins come in contact, and further rotation of said hand H with respect to the hand G is arrested. The post $d'$ also constitutes a support to one end of the hair-spring $n$.

Any suitable means may be employed by which the pendent knob may be caused by its rotation in one direction to arrest the movement of the train.

The means which I prefer to employ consist of a curved slide-bar, whose curve is struck on a circle about equal to that of the inside of the center of the case which contains the works, such bar being arranged to slide below the heel of the balance-bridge, and bearing at one end a flexible arm or prong, which, when the bar is pushed forward, will bear lightly against the rim of the balance-wheel of the movement to arrest its rotation, and, when drawn back, will release said balance.

To actuate the bar I provide the stem of the pendent knob with a pinion, which engages a rack properly cut in this slide-bar, so that the rotary movement of the knob shall cause the sliding movement of said bar.

The operation of the mechanism is briefly as follows: Supposing the mainspring to be wound up and the motion of the train arrested by the stopping of the balance, as before explained, the two hands G H being together and standing at the normal or zero point of the dial, when it is desired to measure a short interval of time, the latch-bar $l$ is first turned into engagement with and so as to prevent rotation of the disk F and hold the hand G motionless, and the pendent knob turned in the direction to release the balance and put the arbor B and outer hand H in rotation, as well as the heart D, the hand G thus denoting the beginning of the interval of time to be noted, and the hand H traveling away from the first with the passage of time, the heart D also rotating with the arbor, while the collet E is stationary, thereby coiling up the spring $n$ and erecting a power to restore the primary position of the hands. As the interval of time to be noted expires, the knob is turned in the opposite direction and the balance is arrested, thereby stopping the hand H at this point. The distance between the two hands denotes upon the scale of the dial the interval of time, and as the hands remain stationary until the knob is again returned, the interval of time may be leisurely noted.

To restore the two hands to their original position—that is, coincident with each other—the latch $l$ is removed from the disk F, and the relaxation of the spring $n$ effects a rotation of the said disk, and the hand G returns to the hand H.

To ascertain the duration of another interval of time, the above manipulations may be repeated with the two hands standing together as left, or, by pushing in the push-plate K, the two hands may be returned together to the zero-point.

It will then be seen that by the turning of the pendent knob in one or the other direction the hands are arrested or allowed to travel, while, by means of the latch-bar $l$, one of such hands is arrested, while the other continues to travel, thus splitting the second-hand, while, finally, the pushing inward of the shank of the pendent knob effects, through an intermediate slider, an inward movement of the push-plate and a restoration of the two hands together to the zero-point.

The purpose of the heart-spring C is to compel the two hands to travel in unison by and with the arbor, as the spring binds on the arbor sufficiently for this; but when the toothed wheel is stopped by the latch the heart-spring slips about the arbor.

I claim—

1. The combination, with the arbor and the heart-cam D, of the disk F, friction-collet E, spring $n$, and the split second-hands carried, one by the heart-cam and the other by the disk, substantially as set forth.

2. The combination, with the arbor and the heart-cam D, carrying one split second-hand and communicating movement to the devices which carry the other split second-hand, of the heart-spring C, substantially as set forth.

3. In combination with the heart-cam D and the disk F, mounted on the arbor and connected with one another by a frictional and spring connection, as described, the latch-bar $l$, substantially as and for the purposes set forth.

4. The combination, substantially as set forth, of the minute heart-cam J, the heart-cam D, and the disk F, mounted on the arbor and connected with one another by a frictional and spring connection, as described, the push-plate K, and the latch-bar $l$, for joint operation, substantially as described.

WILLIAM A. WALES.

Witnesses:
F. CURTIS,
H. E. LODGE.